(12) United States Patent
Kreuter (10) Patent No.: US 6,392,557 B1
(45) Date of Patent: May 21, 2002

(54) PROGRAMMABLE LOGIC CONTROLLER OVERRIDE OUTPUT BOARD

(75) Inventor: Paul E. Kreuter, Goshen, IN (US)

(73) Assignee: Kreuter Manufacturing Company, Inc., New Paris, IN (US)

( * ) Notice: Subject to any disclaimer, the term of this patent is extended or adjusted under 35 U.S.C. 154(b) by 0 days.

(21) Appl. No.: 09/665,081

(22) Filed: Sep. 20, 2000

(51) Int. Cl.⁷ .............................................. G05B 19/02
(52) U.S. Cl. .................. 340/825.22; 340/635; 340/999
(58) Field of Search ................. 340/999, 635, 340/638, 639, 654, 309.15, 825.06, 825.22; 439/59, 157, 629

(56) References Cited

U.S. PATENT DOCUMENTS

| | | | |
|---|---|---|---|
| 3,975,622 A | 8/1976 | Horn et al. ................... 700/17 |
| 4,979,641 A | * 12/1990 | Turner ......................... 222/25 |
| 5,056,001 A | 10/1991 | Sexton ........................ 700/10 |
| 5,155,664 A | 10/1992 | Holterman et al. ......... 361/686 |
| 5,253,140 A | 10/1993 | Inoue et al. ................ 361/728 |
| 5,253,159 A | * 10/1993 | Bilas et al. ............ 340/825.22 |
| 5,444,309 A | 8/1995 | Innes et al. .................. 307/125 |
| 5,651,264 A | 7/1997 | Lo et al. ........................ 62/230 |
| 5,722,887 A | * 3/1998 | Wolfson et al. ........ 340/309.15 |
| 5,811,939 A | * 9/1998 | Herniak ...................... 315/313 |
| 5,830,064 A | * 11/1998 | Bradish et al. ............... 463/22 |
| 5,947,748 A | 9/1999 | Licht et al. .................... 439/59 |

* cited by examiner

Primary Examiner—Van T Trieu
(74) Attorney, Agent, or Firm—Kinney & Lange, P.A.

(57) ABSTRACT

The invention is an override board releasably mounted in a programmable logic controller. The override board is used to control an individual output of the programmable logic controller. The override board includes a manual switch mounted to a printed circuit board assembly. The manual switch has an "auto" position, an "on" position and an "off" position. An output device is also mounted to the printed circuit board assembly and is electrically connected to the manual switch. Placing the manual switch in the "auto" position transfers control of the override board to the programmable logic controller. Placing the manual switch in the "on" position energizes the output device. Placing the manual switch in the "off" position de-energizes the output device.

20 Claims, 12 Drawing Sheets

PROGRAMMABLE LOGIC CONTROLLER OVERRIDE OUTPUT BOARD

BACKGROUND OF THE INVENTION

The invention relates to programmable logic controllers. Specifically, the invention utilizes removable boards inserted into a programmable logic controller to allow the user to manually override specific outputs of the controller.

Prior to the development of solid state switching devices, electro-mechanical relays, timers, counters, and sequencers were used in control panels in various interconnecting sequences to control and automate processes. These panels were unwieldy in size, slow to react, and inflexible if the process being automated was changed. Advances in semiconductor technology have resulted in the development of programmable logic controllers (PLCs). PLCs are used in any application which has required the automation of a process. According to the National Electrical Manufacturers Association (NEMA):

> A PLC is a digitally operated electronic system, designed for use in an industrial environment, which uses a programmable memory for the integral storage of user-oriented instructions for implementing specific functions such as logic, sequencing, timing, counting, and arithmetic to control through digital or analog inputs and outputs, various types of machines or processes. Both the PLC and it's associated peripherals are designed so that they can be easily integrated into an industrial control system and easily used in all their functions.

National Electrical Manufacturers Association, NEMA IA 2.1 standard, adopted from the International Electrotechnical Commission, IEC 1131 standard, part 1, section 2.50.

PLC's have a great economic advantage over other controlling methods in that one PLC can be used with a wide range of control systems. To modify the PLC to accommodate a variety of different processes, there is no need to rewire the PLC. All that is necessary is for an operator to program a different set of instructions. This flexibility allows a single PLC model to be bought off the shelf and utilized in a variety of applications, eliminating the need for specialized wiring designs and allowing large numbers of the PLC model to be mass produced, thereby lowering the cost of each unit.

A PLC typically consists of an input section, a logic (or processing) section, an output section, and a power supply. Typically, the power supply is used to provide logic level voltage (around 5–15 VDC) to the logic portion of the PLC. The input section receives electrical signals from various sensor units which are converted to logic signals. Examples of input sensing devices would include: limit switches, toggle switches, selector switches, push button switches and solid state proximity devices. Once an input signal is received by the input section and converted to a logic signal, it is communicated to the logic sections. The logic section then evaluates the input (or multiple inputs) with respect to a pre-programmed series of logic steps to determine if an output signal should be generated. A series of programmable logic steps is used to make this determination. Subsequently, a control signal is sent to the output section which biases a switching mechanism inside the output module (typically a solid state switching device, such as a transistor) into an "ON" or "OFF" position depending on the nature of the output signal. The switching mechanism is used to control a load which is connected to terminals on the output section. This is typically accomplished by providing power to the output module at a "common" terminal and allowing it to pass through (or preventing it from passing through) the switching device (transistor), thereby enabling (or disabling) the desired load. The load could be almost anything, including lights, motor starters, contactors, and resistive heating elements. Multiple inputs and outputs are provided with an individual PLC, allowing a large number of loads to be controlled by a single PLC.

One problem with current PLC's is that in certain situations, it may be desirable to manually override the logic portion of the PLC so as to generate an output signal regardless of whether the appropriate input signal has been detected by the PLC (for example when maintenance is being performed on the PLC or the load). This situation arises particularly when the PLC is controlling the environmental conditions of buildings, such as when controlling heating, ventilation and air-conditioning equipment, overhead lighting, and alarm systems. It is desirable to override the control of certain loads while allowing the PLC to maintain control over the other PLC outputs, since it may often be desirable to turn one system off or on while allowing the others to continue to operate. For example, it may be desirable to turn off a heater for maintenance without disabling an alarm system. Maintaining the flexibility to choose which (if any) output has this override feature without losing the ability to manufacture the PLC in the most economical manner is extremely valuable.

Additionally, it may be desirable in some situations to allow for additional or alternate switching mechanisms to be interposed between the controlled load and the switching mechanism of each PLC output. These switches may be necessary to control a variety of loads which require various current and voltage requirements. It would be desirable to install these switching mechanisms without having to purchase a completely different PLC output section containing different switching mechanisms in the output section of the PLC. Previously, to address this problem, an additional switching mechanism (such as a electromechanical relay) was disposed electrically downstream from the output section of the PLC. The additional switching mechanism was not purchased as a package with the PLC but instead was separately engineered, installed and mounted outside the PLC. The output section of the PLC actuated the coil of the electromechanical relay which allowed the making and breaking of the circuit controlling the load through the relay contacts. Installing this additional switch required wiring additional circuit boards or switching mechanisms to the terminals of the output section. The switches were physically mounted to a support structure (such as a din rail) externally from the PLC. This method of adding another switching mechanism has many drawbacks. For example, it required additional designing, it was not modular or "off the shelf" and it required additional installation space.

Therefore, a need exists in the art which allows the output section of a PLC to be manually overridden at the installation site of the PLC. Additionally, a need exists in the art for a modular system to provide flexibility to the output modules of PLC's, allowing the end user to alter the load carrying capacity of the output device, without requiring a complicated installation process.

BRIEF SUMMARY OF THE INVENTION

The invention is an override board releasably mounted in a programmable logic controller. The override board is used to control an individual output of the programmable logic controller. The override board includes a manual switch mounted to a printed circuit board assembly. The manual switch has an "auto" position, an "on" position and an "off" position. An output device is also mounted to the printed circuit board assembly and is electrically connected to the manual switch. Placing the manual switch in the "auto" position transfers control of the override board to the programmable logic controller. Placing the manual switch in the "on" position energizes the output device. Placing the manual switch in the "off" position de-energizes the output device.

Additionally, a feedback circuit may be provided on the printed circuit board assembly which provides a signal to the programmable logic controller. The feedback signal indicates the position of the manual switch. A light emitting diode may also be mounted to the printed circuit board assembly, providing a visual indication of whether the output device is energized or de-energized.

DETAILED DESCRIPTION

Figure 1:
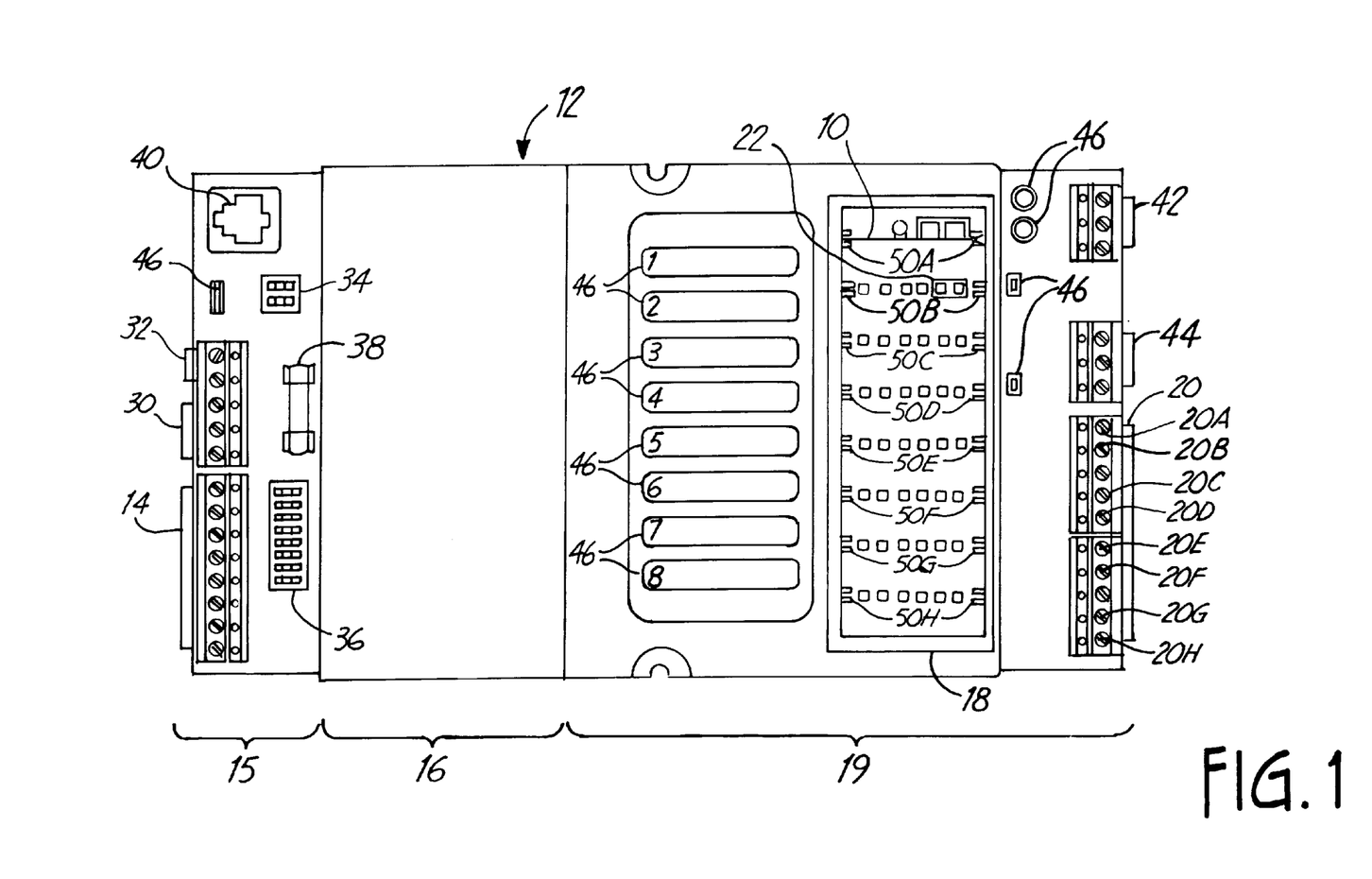
FIG. 1 is a top view of a PLC containing the inventive override board.

An embodiment of the inventive output override boards is illustrated at 10 in FIG. 1. The output override board 10 is shown mounted in a programmable logic controller (PLC) 12. The PLC 12 includes input terminals 14, an input section 15, a logic section 16, a controller connector portion 18, an output section 19 and output terminals 20. A jumper 22 is additionally disposed in the controller connection portion 18.

It should be understood that other optional features found in typical PLC's may be included as part of the PLC 12 which are not necessary for operation of the inventive output override board 10. For example, the PLC 12 may include separate ground terminals 30, supply voltage terminals 32, power jumpers 34, pull up resistor dip switches 36, input fusing 38 and a PC port 40 for interfacing the logic section 16 with a personal computer. Network terminals 42 may also be provided for interfacing the PLC 12 with a computer network (not shown). Output analog ground terminals 44 and visual indicators 46 may also be provided. These features are exemplary of some of the features which may or may not be included on the frame of the PLC 12.

The controller connection portion 18 includes a plurality of board tracks 50A–50H disposed so as to allow the output override boards 10 to be connected to the PLC 12. Each set of tracks 50A–50H corresponds to an individual output terminal 20A–20H. As is illustrated, one output override board 10 may be mounted to each set of board tracks (e.g. 50A) so as to control one output terminal (e.g. 20A). Jumper 22 is mounted in board track 50B which corresponds to output terminal 20B in the same fashion as the output override board 10.

In the configuration described, the output override board 10 may be used by an operator to manually override the output signal emitted from output terminal 20A. On the other hand, the output from output terminal 20B is solely controllable by the PLC 12 due to the presence of the jumper 22. The jumper 22 is used when the control of a particular output is only to be controlled by the PLC 12. The jumper 22 is typically any type of electrical conductor which can complete the electrical path to the output. As is illustrated, the output override board 10 and the jumper 22 can easily be interchanged or inserted within any of the board tracks 50A–50H of the controller/connector portion 18, allowing for an operator to easily make installation site modifications to the PLC 12. Preferably, to connect the output override board 10 to the PLC 12, a socket on the output override board 10 plugs into pins on the PLC 12. While this connection method is preferred and described further with respect to the specific embodiments of the inventive output override board 10, it would be obvious to use any number of quick connect and release methods known to those skilled in the art.

Figure 2:
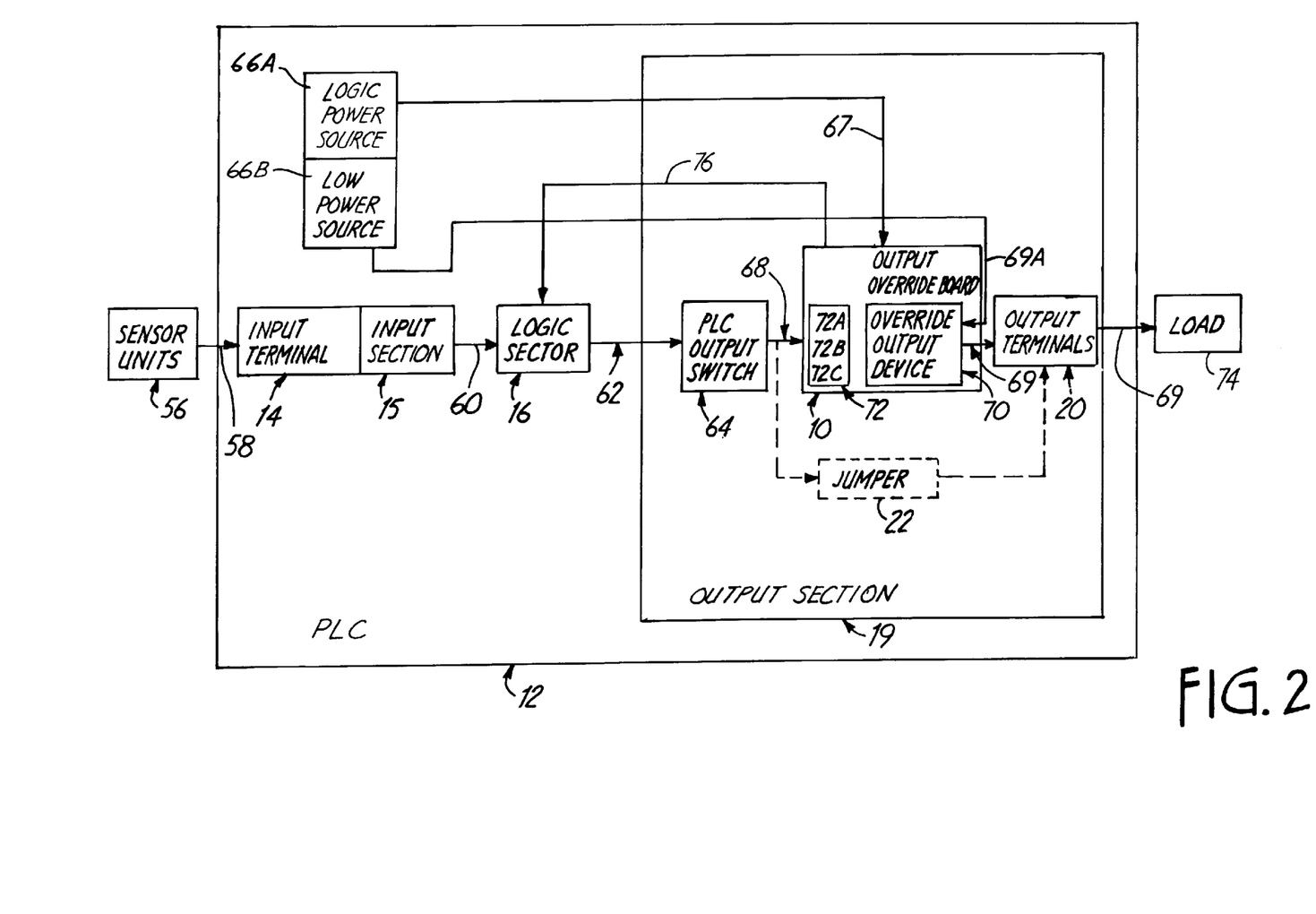
FIG. 2 is a block diagram of the operation of the inventive override board in a PLC.

The block diagram in FIG. 2 illustrates the operation of the override board 10 in conjunction with the PLC 12. Sensory units 56 are used to detect environmental or process conditions and provide input to the PLC 12. These sensor units 56 may include any number of sensing devices, examples include limit switches, toggle switches, selector switches, push button switches, thermistors, and proximity switches. The sensor units 56 generate an electrical input signal 58 into the input terminals 14. The input section 15 of the PLC 12 translates the input signal 58 into a logic signal 60. The logic signal 60 is evaluated by the logic section 16 against a variety of programmed parameters incorporated as logical steps, as is known in the art. Depending on the outcome of the logic steps, the logic section 16 may or may not generate an output signal 62 to the output section 19.

The output section 19 includes a PLC output switch 64, the override board 10 and the output terminals 20. A logic power source 66A is provided (either externally or internally to the PLC 12) to energize the output override board 10. A logic signal 67 is provided from the logic power source 66A to the output override board 10. The override board 10 includes an override output device 70 and a manual switch 72. The PLC output switch 64 provides an actuating signal 68 to the override board 10. If the manual switch 72 on the output override board 10 is in a first position (or "auto" position) 72A the override output device 70 energizes or de-energizes according to the actuating signal 68 from the PLC 12. A load signal 69 is provided to (or alternately removed from) the output terminal 20. The load signal 69 may originate from the logic signal 67 from the logic power source 66A or alternately may be supplied by a separate load power source 66B. If a load power source 66B is utilized, a signal source 69A is sent from the load power source 66B to the override output device 70. If the manual switch 72 is in a second position (or "hand" or "on" position) 72B, the override output 70 is placed in a constant "energized" position. Finally, if the manual switch 72 is in a third position (or "off" position) 72C then the override output device 70 is in a constant "de-energized" position. Depending upon the configuration of the override output device 70 (described further with respect to the embodiments below), a signal is constantly provided or not provided to the output terminal 20 when the manual switch is in the "hand" 72B or "off" 72C positions.

A load 74 is connected to the output terminal 20 associated with the override board 10 and is activated or deactivated according to whether the load signal 69 is being provided to the output terminal 20. Examples of possible loads would be resistive loads, motors, coils for electromechanical relays, compressors or anything which can be energized by an electrical output. A feedback signal 76 is preferably provided from the output board 10 to the PLC 12 to communicate the position (72A, 72B or 72C) of the manual switch 72 to the PLC 12.

Alternatively, the override board 10 may be removed from the output section 19 and a jumper 22A inserted in its place (illustrated using dotted lines). In this configuration, the actuating signal 68 from the PLC output switch 64 is routed directly to the individual output terminal 20 and subsequently to the load 74.

It should be apparent that by inserting the override board 10 in the output section 19 of the PLC 12, an additional controlling device (specifically override output device 70) can be inserted between the PLC output switch 64 and the controlled load 74. Additionally, the manual switch 72 allows the override output device 70 to be controlled by the PLC 12 in the "auto" position (first position 72A) or by the operator in the "on" or "hand" position (second position 72B) or the "off" position (third position 72C).

Thus, the output override board 10 provides an optional manual override feature that can be inserted at the user's discretion for each output of the PLC 12. Additionally, an alternate controlling device (the override output device 70) can be inserted or removed according to the requirements of the system without requiring purchasing an entirely different PLC 12, or adding components outside the PLC 12. The ease at which the boards 10 can be inserted or replaced with the jumper 22A provides a versatile modular system which can be upgraded or altered to handle any change in the process being controlled by the PLC 12. This versatility is further illustrated by the embodiments discussed below. A variety of output override boards 10 may be provided for insertion in the PLC 12 which allows a variety of load types to be controlled.

It should be noted that in the below discussion, alternative embodiments of the inventive output override board 10 are discussed. During this description, like elements for each of the embodiments are described using the same reference numbers. It should also be noted that in the figures which depict circuit diagrams (FIGS. 3, 4, 5, 6 and 7) symbols may be used to indicate the continuity of a circuit (such as symbols 95 and 96). Wherever those symbols are used indicates an electrical connection exists between the like symbols. This notation is known to a person skilled in the art.

Figure 3:
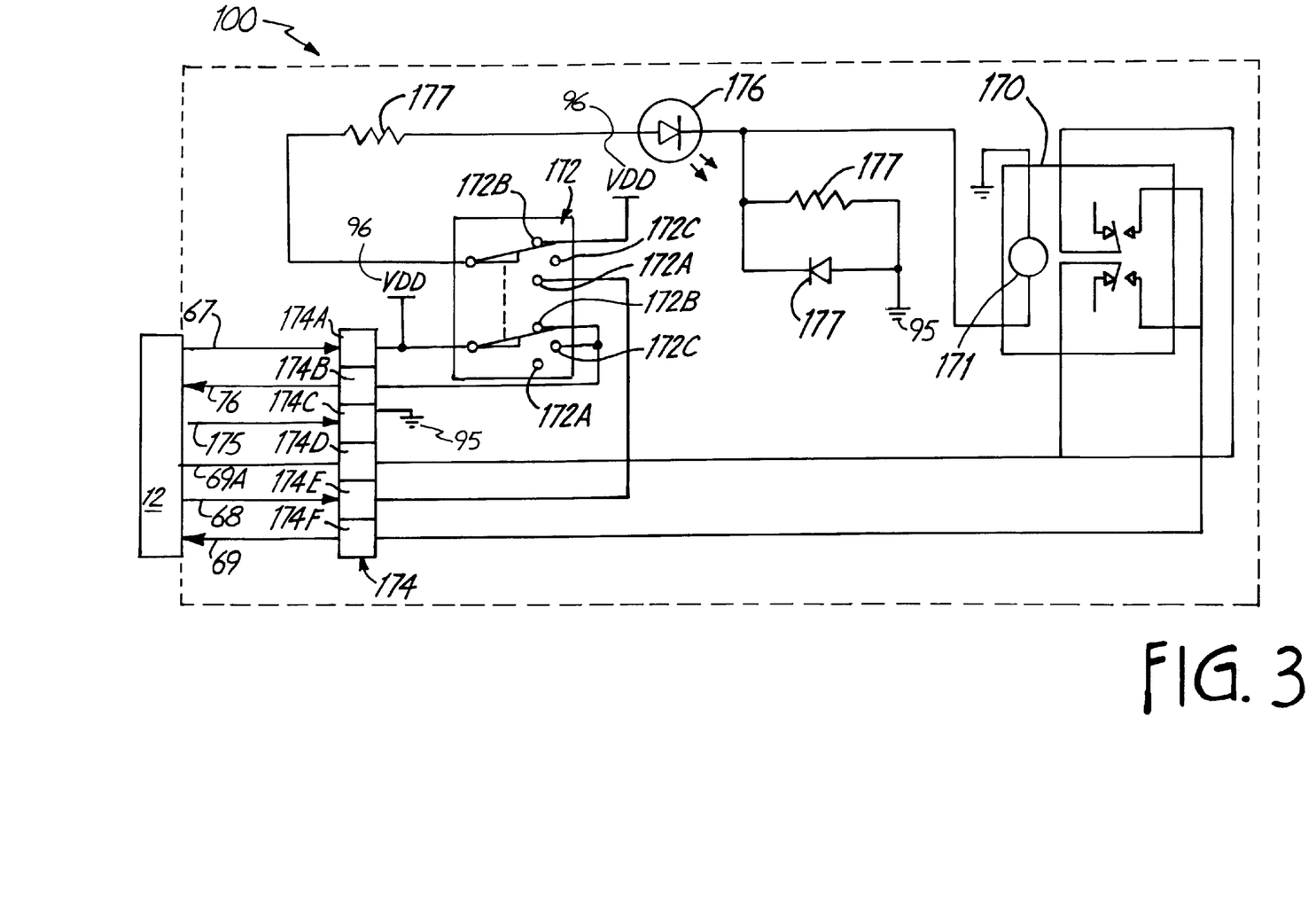
FIG. 3 is a circuit diagram for a first embodiment of the inventive override board.
Figures 3A, 3B:
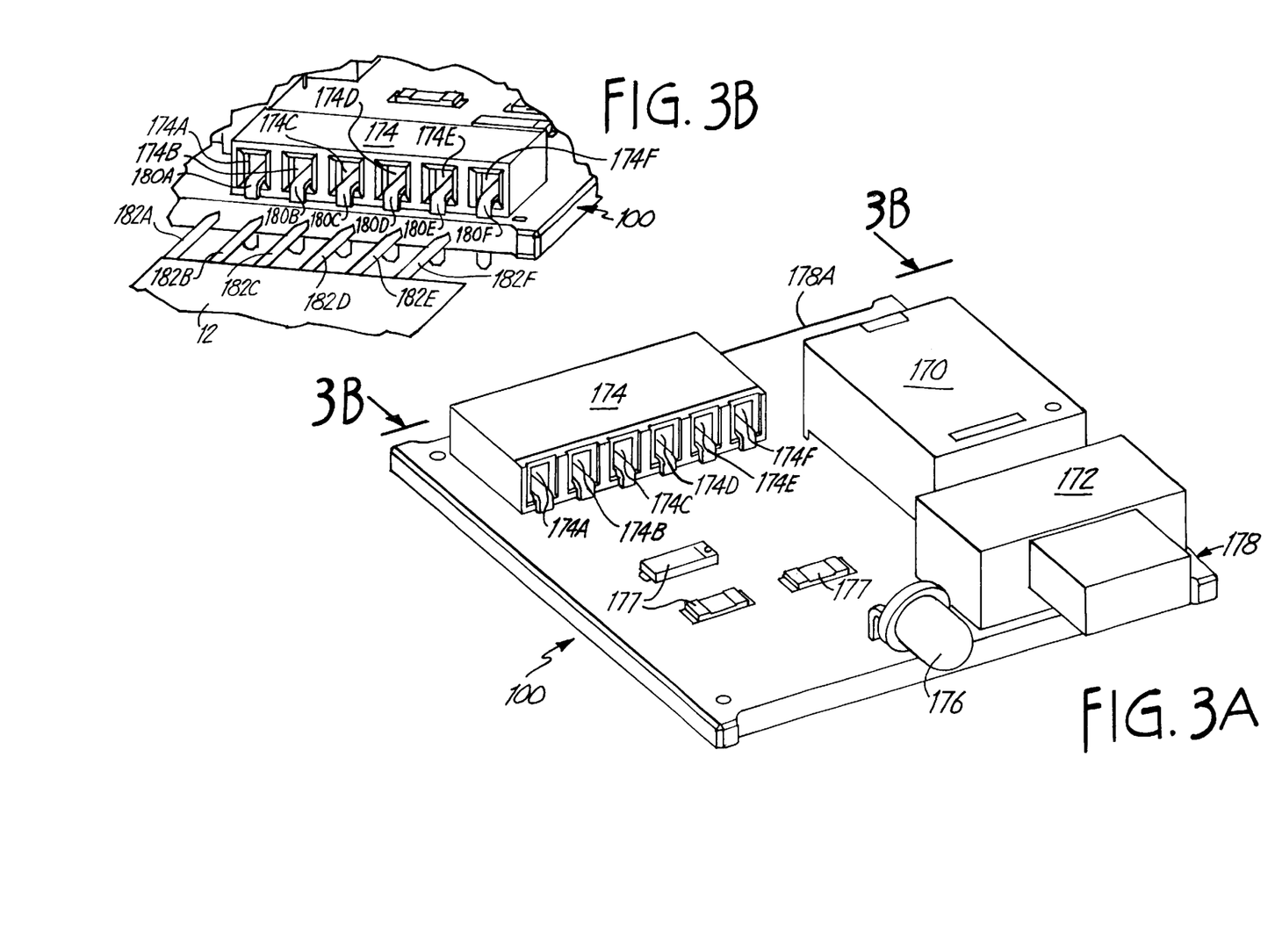
FIG. 3A is a perspective view of the first embodiment of the inventive override board.
FIG. 3B is a partial perspective view of the first embodiment of the inventive override board taken along lin 3B-3B of FIG. 3A.

A first embodiment of the inventive output override board 100 is illustrated at 100 in FIGS. 3 and 3A. FIG. 3 illustrates the circuit of the output override board 10. In this embodiment, a normally open electrical-mechanical relay is used as the override output device 170. A connector 174 is releasably connected to the PLC 12 as further described below with respect to FIG. 3B. A plurality of interface sockets 174A–174F in the connector 174 corresponds to a separate input or output of the output override board 100. For example, first socket 174A corresponds to the logic signal 67 provided to the output override board 100 and second socket 174B corresponds to the feedback signal 76 provided to the PLC 12. I would be understood by a person skilled in the art that the interface sockets 174A–174F may be placed in any order without departing from the spirit and scope of the invention.

A manual switch 172 (of a type as is known in the art), is provided. The manual switch 172 is illustrated as having two sets of contacts, however, a person skilled in the art would realize that other configurations could be used without departing from a spirit and scope of the invention. The manual switch 172 can be moved through three slide switch positions (first 172A, second 172B and third 172C) as discussed previously. As the manual switch 172 is moved through the three positions, interface socket 174A is connected or disconnected to interface socket 174B. Preferably, when the switch 172 is in the second or third position 172B or 172C, a connection is made between the first interface socket 174A to the second interface socket 174B. By configuring the output board 100 in this fashion, a feedback signal 76 is generated by the board 100 and sent to the PLC 12. When the feedback signal is present, it informs the PLC 12 that the output override board 10 is in either the "hand" position or the "off" position 172B or 172C. If the feedback signal 76 is not present, the PLC 12 can detect that the manual switch 172 is in the "auto" position 172A. Depending on the configuration of the PLC 12, a signal could then be generated which remotely informs an operator of the status of the override board 10. For example, a signal could be sent to a remote computer system monitoring the PLC 12.

The remaining interface sockets 174C–174F relate directly to the control of the override output device (normally open relay) 170. Interface socket 174C provides an electrical ground 175 to the output override board 100. Interface socket 174E provides the actuating signal 68 from the PLC 12 to an actuating coil 171 of the normally open relay 170. Interface socket 174D and 174F are connected by a circuit path through the contacts of the normally open relay 170 which makes (provides an electrical path) or breaks (opens the electrical path) the circuit. The normally open relay 170 thus provides a path for the signal source 69A to travel from the interface socket 174D through the normally open relay 170 and out interface socket 174F as load signal 69.

In this embodiment, the signal source 69A is provided into interface socket 174D and the load signal 69 is directed out of interface socket 174F. Additionally, a light emitting diode (LED) 176 may optionally be provided. The LED 176 provides an indication as to when power is being supplied to the coil 171 of the normally open relay 170. Thus, the operator can verify that a load signal 69 is being generated by the output override board 100 through the closed contacts of the normally open relay 170 by viewing whether the LED 176 is lit. Additional voltage and current regulating devices 177, which include such devices as resistors and diodes may be provided, as is known in the art.

When the manual switch 172 is in the first position 172A the normally open relay 170 is controlled by the actuating signal 68 generated by the PLC. The actuating signal 68 is alternately sent or not sent to interface socket 174E by the PLC output switch 64 (illustrated in FIG. 2). This signal alternately energizes or de-energizes the coil 171 of the normally open relay 170. Thus, the PLC is able to control the opening and closing of the contacts of the normally open relay 170, thereby making (providing an electrical path) and breaking (removing the electrical path) the circuit supplying the load signal 69 through interface sockets 174D and 174F. As the actuating signal 68 is provided to the coil 171, it passes through the LED 176, causing it to light.

When the manual switch 172 is placed in the second position 172B, the output override board 100 is placed in the "on" or "hand" position. In this position, the logic signal 67 is provided from interface socket 174A through the manual switch 172, through the LED 176 (causing the LED to emit light) and finally to the coil 171 of the normally open relay 170. The coil 171 is energized, and the contacts of the normally open relay 170 are closed, providing a path (or "making" the circuit) for the load signal 69 to travel from interface socket 174D to interface socket 174F. Thus, a constant load signal 69 is provided through the PLC 12 to the load 74.

If the manual switch 172 is placed in the third position 172C, no power is provided to the coil 171 of the normally open relay 170. Thus, the contacts of the normally open relay 170 are opened and no path is provided for the load signal 69 (or the circuit is "broken") through interface sockets 174D and 174F.

A perspective view of the first embodiment of the override board 100 is illustrated in FIG. 3A. The components of the circuit discussed with respect to FIG. 3 are mounted on a printed circuit board 178 and electrically connected by conducting paths or "traces" (not shown) or by electrical wiring in a manner known in the art. The normally open relay 170 preferably can switch and carry up to approximately 2 amperes and 30 volts AC/DC load signal 69. The interface connector 174 is disposed proximate to a bottom edge 178A of the printed circuit board 178 such that the interface connector 174 provides accessibility to the individual interface sockets 174A–174F.

A partial view of the connector 174 is illustrated in FIG. 3B. The connector 174 includes a plurality of receiving pins 180A–180F such that one of the pins 180A–180F is disposed in each interface sockets 174A–174F. The individual interface sockets 174A–174F are configured to mate with male pins 182A–182F attached to the PLC 12. It should be noted that this attachment configuration is exemplary and other means of electrically connecting the output override board 100 to the PLC 12 are known to a person skilled in the art, including reversing the position of the male pins 182A–182F and the sockets 174A–174F.

Figure 4:
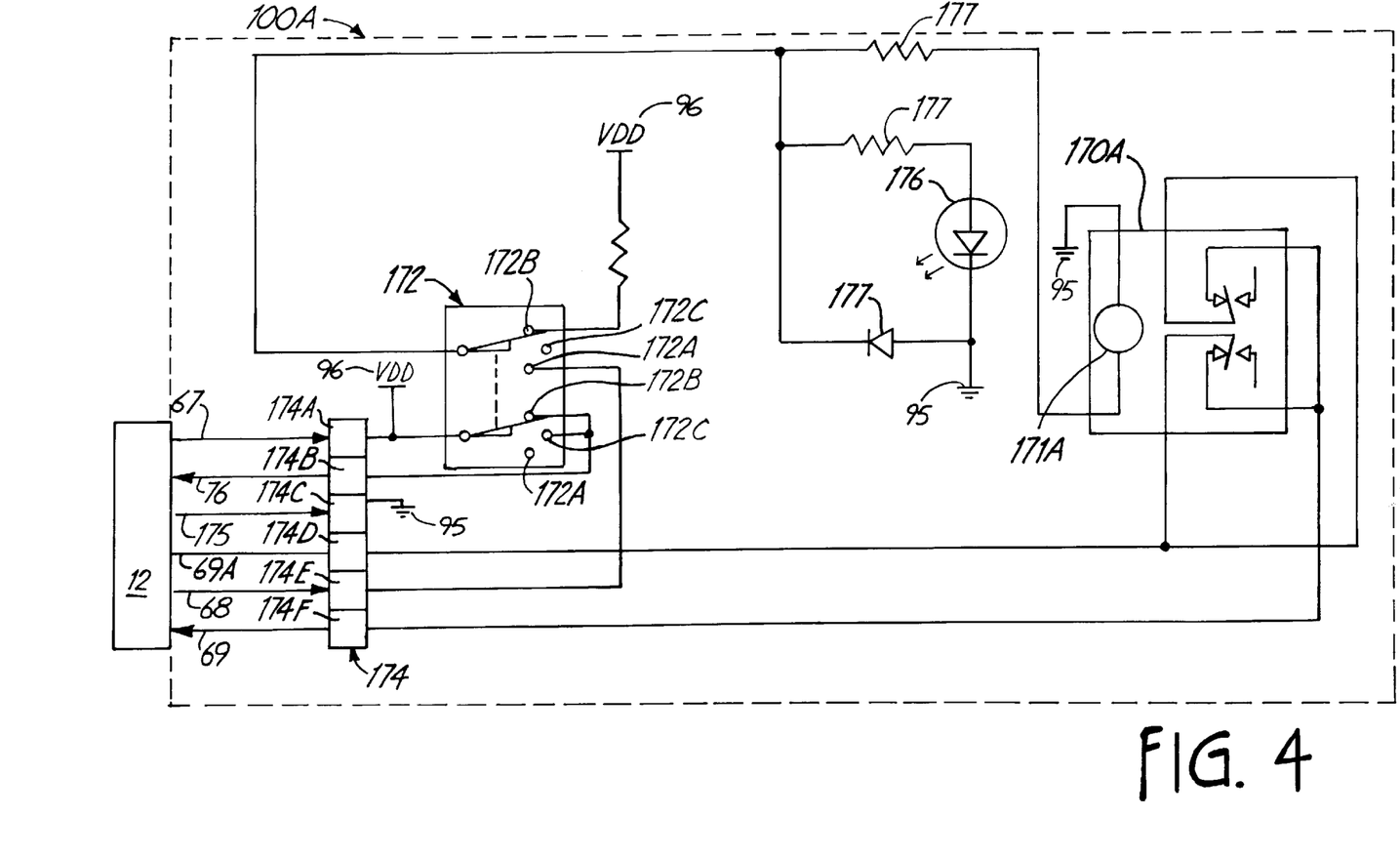
FIG. 4 is a circuit diagram for a second embodiment of the inventive override board.

FIG. 4 illustrates a second embodiment of the output override board 100A utilizing an alternate override output device 170A (including actuating coil 171A). The circuit for the second embodiment of the output override board 100A is substantially the same as that described for the first embodiment of the output override board 100 as illustrated in FIG. 3. In particular, the feedback signal 76 is generated in the same manner as was described with respect to the first embodiment. There are two main differences between the first and the second embodiments output override board 100 and 100A. First, a normally closed relay is used as an override output device 170A. Secondly, the placement of the voltage and current regulating devices 177 may be positioned at different points throughout the circuit layout, as would be known to one skilled in the art. Upon energizing the actuating coil 171A the output override device (normally closed relay) 170A is moved from a position where the contacts of the normally closed relay 170A are closed to a position where the contacts of the normally closed relay 170A are in an open position. When no signal (either logic signal 67 or actuating signal 68) is supplied to the coil 171A, a circuit path is provided for the signal source 69A to be directed from interface socket 174D to interface socket 174F where it is supplied as load signal 69. Alternatively, when a signal (logic signal 67 or alternating signal 68) is supplied to the coil 171A the coil energizes and the circuit path is broken. Thus, the load signal 69 is not supplied through socket 174F. In this embodiment, when the manual switch 172 is placed in the "hand" or "on" position, a circuit path is provided for the load signal 69, however, the LED 176 is not lit. When the LED is lit, the operator is informed that no load signal is being provided exactly opposite from the first embodiment. When the manual switch 172 is placed in the third position 172C, power is provided to the coil 171A and the contacts of the normally closed relay 170A are opened and no path is provided for the load signal 69. Once again, placing the manual switch in the first position 172A allows the PLC 12 to control the normally closed relay 170A via actuating signal 68. It should be clear to one skilled in the art that the use of the normally closed relay 170A causes the switching of the manual switch 172 to have the opposite effect on the load signal 69 as occurred in the first embodiment of the output override board 100 which utilized the normally open relay 170 (FIG. 3).

Figure 4A:
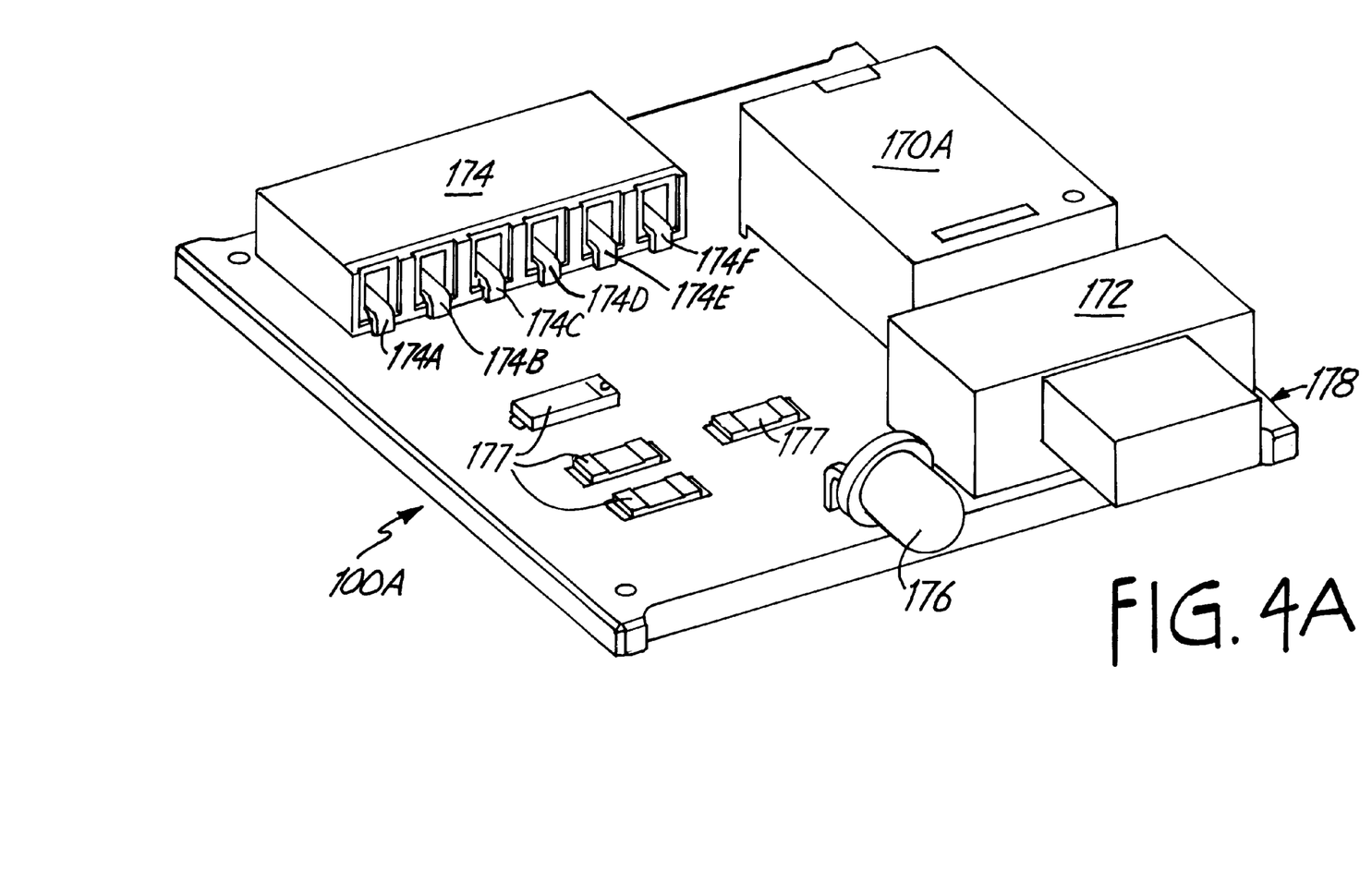
FIG. 4A is a perspective view of the second embodiment of the inventive override board.

As is illustrated in FIG. 4A, the layout of the physical embodiment of the output override board 100A is substantially similar to that of the first embodiment of the output override board 100. Once again, the components of the circuit are mounted on printed circuit board 178 and electrically connected by "traces". The main difference is that the normally closed relay 170A is used as the override output device. It would be realized by a person skilled in the art that modifying the component layout of the output override board 100A would not depart from the spirit and scope of the invention.

Figure 5:
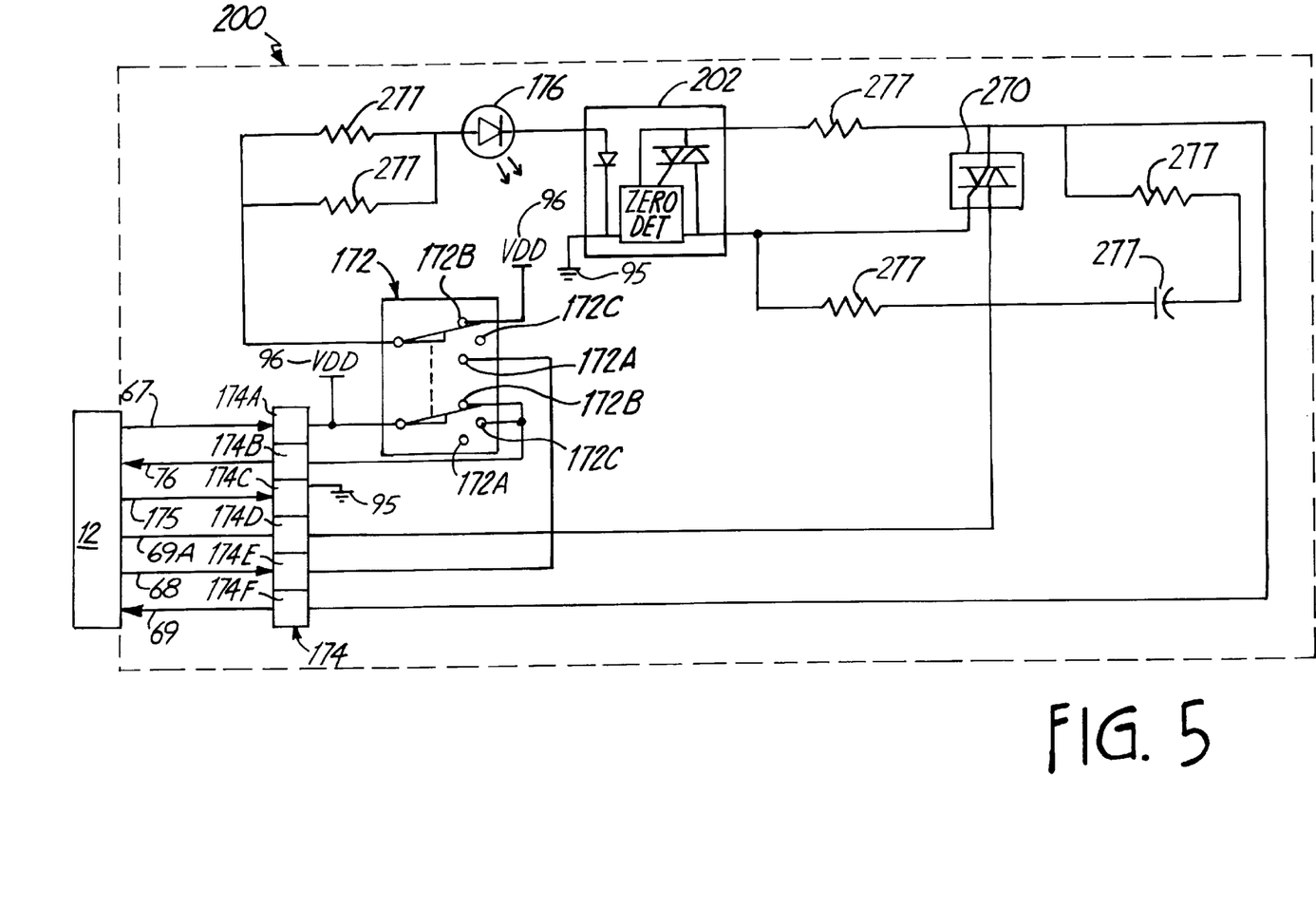
FIG. 5 is a circuit diagram for a third embodiment of the inventive override board.

FIG. 5 illustrates a third embodiment of the output override board at 200. In this embodiment, a triac is used as an override output device 270. Operation of the third embodiment of the output override board 200 is similar to that of the first embodiment 100 discussed above. The feedback signal 76 is generated in the same fashion as was described with respect to the first embodiment.

Placing the manual switch 172 in the "auto" or first position 172A allows the PLC to control the output device (or triac) 270 and alternately provide or remove the load signal source 69A through triac 270 so that the load signal 69 is provided to the PLC 12 and ultimately the load 74.

When the manual switch 172 is placed in the second position 172B, the output override board 200 is placed in the "on" or "hand" position. In this position, the logic signal 67 is directed from interface socket 174A through the manual switch 172, to LED 176 (causing the LED 176 to give off light and indicate to the operator that a load signal 69 is being generated). The logic signal 67 is typically routed through an optical isolator 202 (as is known in the art) to isolate the logic signal 67 which is typically DC voltage, from the load signal 69, which is typically AC voltage. The logic signal 67 actuates the optical isolator 202 and forward biases the override output device (or triac) 270, allowing the load signal source 69A to flow from interface socket 174D through the triac 270 and out interface socket 174F as load signal 69, thereby providing current to the load. As was described with respect to the first embodiment, placing the manual switch in the third position 172C prevents the load signal 69 from being generated. Additionally, no power is provided to the LED 176. Additional voltage and current regulating devices, such as resistors, and capacitors 277 may be provided in a manner known to those skilled in the art.

Figure 5A:
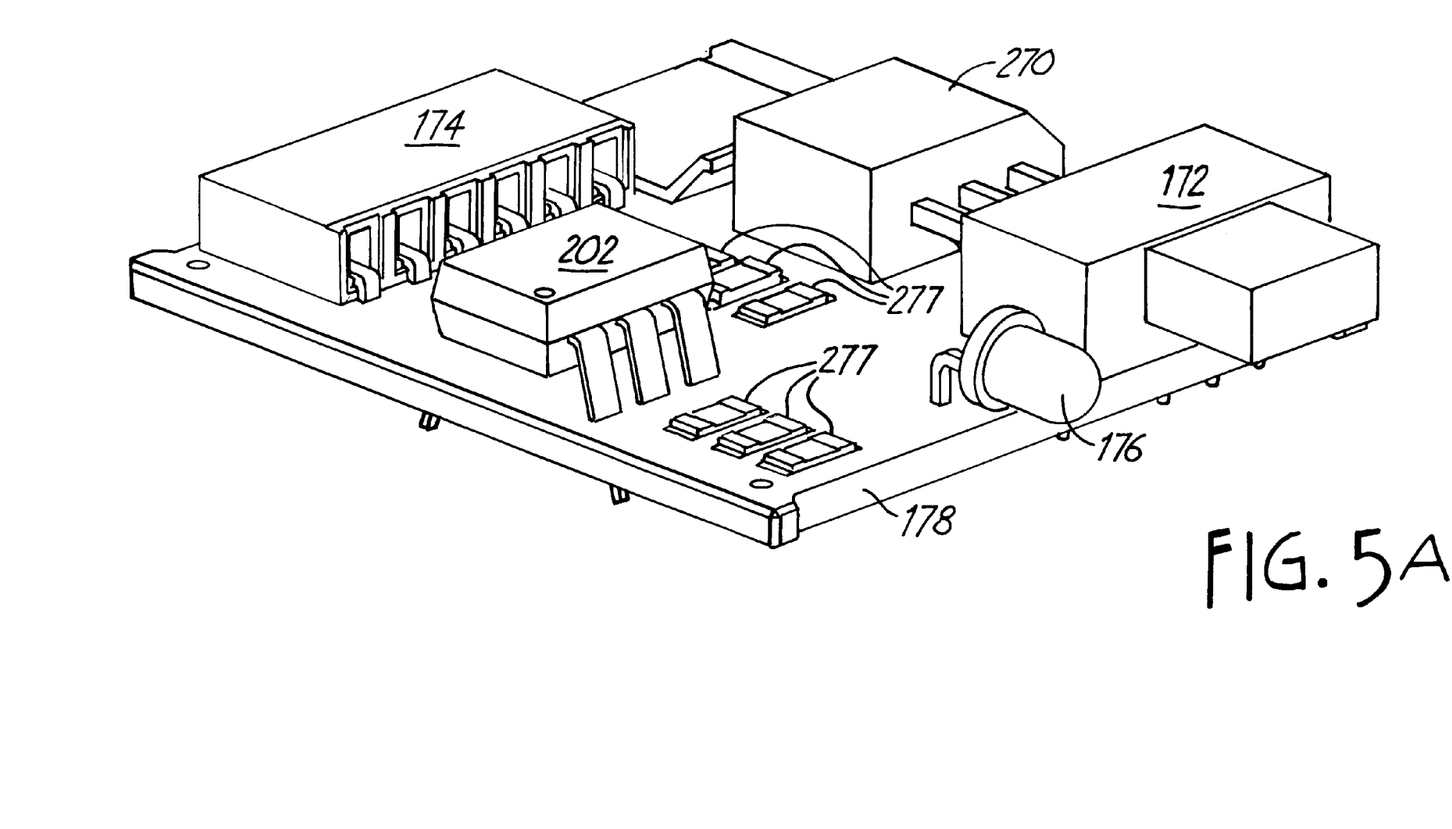
FIG. 5A is a perspective view of the third embodiment of the inventive override board.

A perspective view of the third embodiment of the output override device 200 is illustrated in FIG. 5A. The triac 270 is shown mounted to the printed circuit board 178. The components on the printed circuit board 178 are electrically interconnected as described previously. Preferably, the triac 270 is rated at approximately 30 volts AC maximum, 12 volts AC minimum, and 20 milliamps minimum current. A person skilled in the art would realize that the particular triac 270 used can be selected to accommodate the desirable current carrying capacity for various applications.

Figure 6:
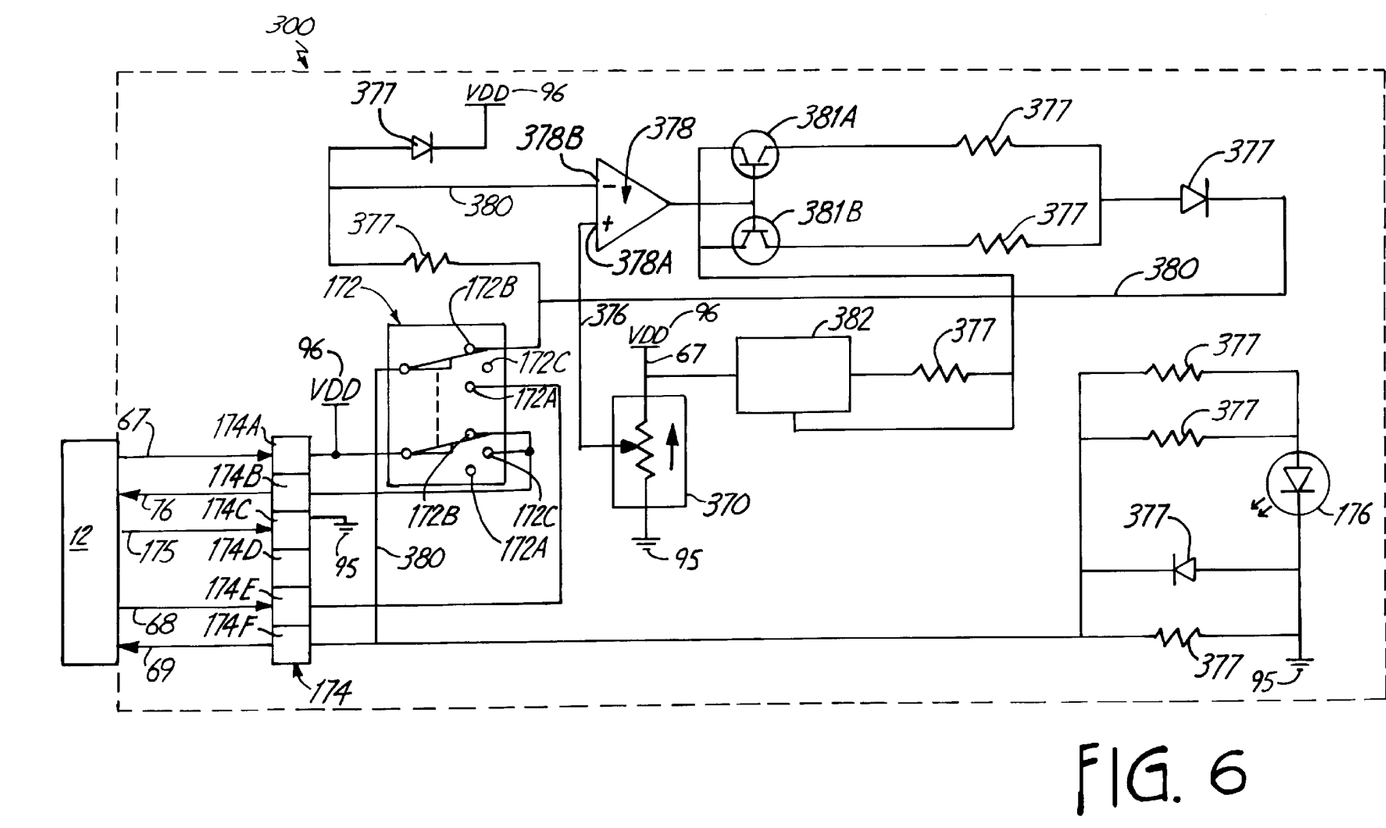
FIG. 6 is a circuit diagram for a fourth embodiment of the inventive override board.

FIG. 6 illustrates a fourth embodiment of the output override board indicated at 300. Once again, the feedback signal 76 is generated in the same fashion as was described with respect to the first embodiments. A potentiometer is used as an override output device 370. When the manual switch 172 is placed in the auto position 172A the actuating signal 68 from the PLC 12 is directed through interface socket 174E through the manual switch 72 and out interface socket 174F as load signal 69. Thus, the signal from the PLC 12 completely bypasses the override output device (potentiometer) 370. The actuating signal 68 from the PLC 12 is also directed through the LED 176 to indicate when the signal is being provided from the PLC to the output override board 300 and the load signal 69 is being generated.

Placing the manual switch 172 in the hand position 172B generates a variable voltage load signal 69 to interface socket 174F. To adjust the voltage of the load signal 69, the potentiometer 370 is manually adjusted by the operator. To supply power to the potentiometer 370, the input logic signal 67 is directed to the potentiometer 370. A potentiometer output voltage 376 is generated and can be adjusted by varying the resistive setting of the potentiometer 370. The potentiometer output voltage 376 is connected to an op amp 378 at a first input 378A. The potentiometer input voltage 376 is compared against an actual output voltage 380 generated by the output override board 300. If the compared voltages are out of balance, the op amp 378 throttles open or throttles closed (depending on whether the actual output voltage 380 is greater or less than the potentiometer input voltage 376) a pair of throttling transistors 381A and 381B which allow more or less voltage to pass through according to the op amp 378 comparison. This throttling increases or decreases the output voltage 380 provided to the op amp 378 as well as the load signal 69 provided to interface socket 174F. The circuit path from the throttling transistors 381A and 381B is split so one path leads to the op amp 378 and a second leads to interface socket 174F. The first path provides the actual output voltage signal 380 to the op amp 378 (at the second input 378B). The second path delivers the load signal 69 to interface socket 174F.

Thus, the op amp 378 is continually monitoring the desired output voltage (as specified by the operator through the potentiometer 370) to the actual output voltage 380 generated by the throttling transistors 381A and 381B. Since the throttling transistors 381A and 381B are also tied to interface socket 174F, the load signal 69 is varied as well. The load signal 69 is directed through the manual switch 172 to interface socket 174F. Additionally, the load signal 69 is directed through the LED 176 so as to provide a visual indication that the load signal 69 is being delivered to the interface socket 174F. A current regulator 382 is preferably used to limit the current provided to the throttling transistors 381A and 381B, in a manner known to those skilled in the art.

Finally, if the manual switch 172 is placed in the off position 172C, no connection is made to interface socket 174F, and no load signal 69 is generated. Additionally, no current is provided to the LED 176 thereby informing the operator that no load signal 69 is being delivered to interface socket 174F. Additional voltage and current regulating devices 377, which include such devices as resistors and diodes may be provided as is known in the art.

Figure 6A:
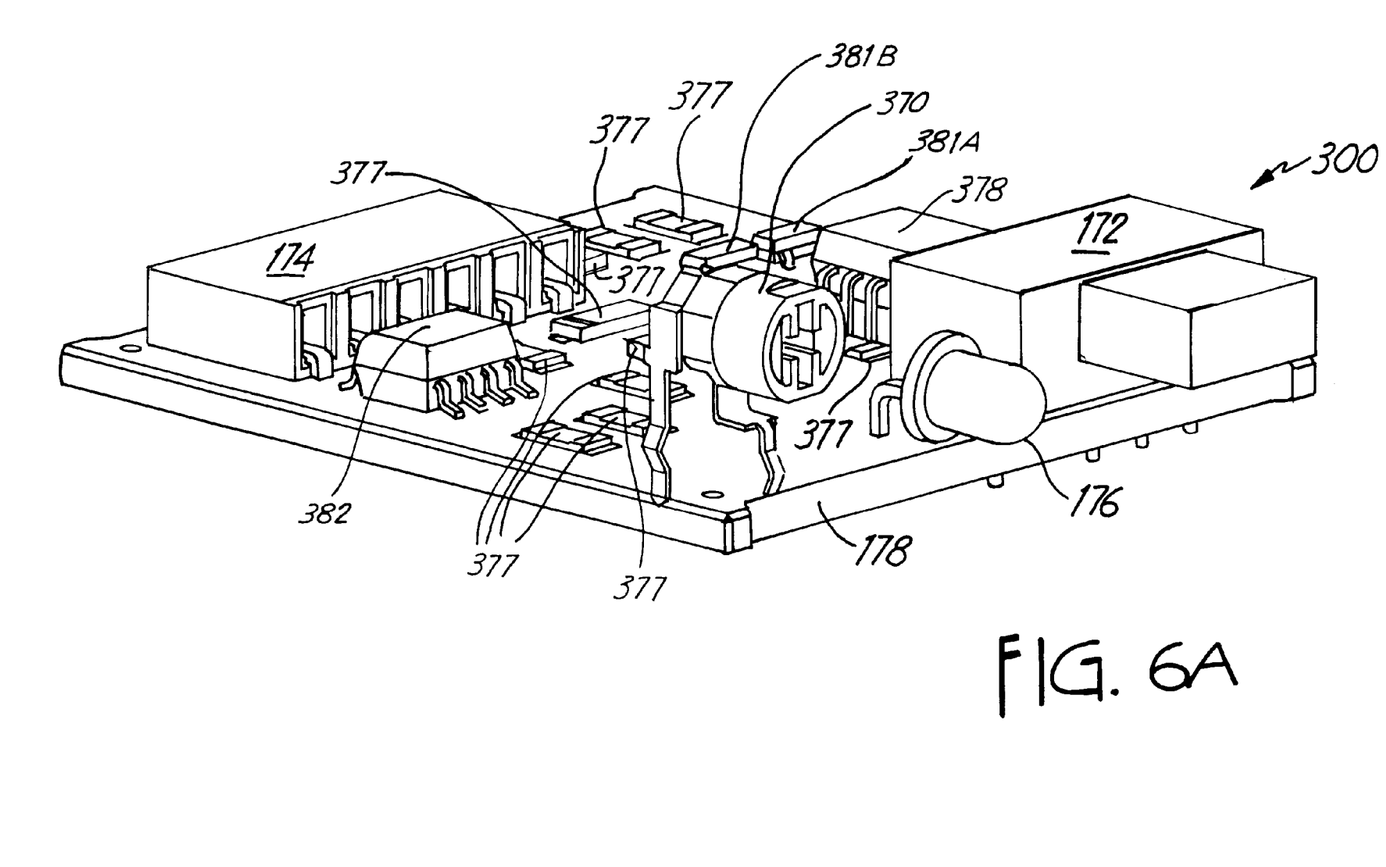
FIG. 6A is a perspective view of the fourth embodiment of the inventive override board.

A perspective view of the fourth embodiment of the override output board 300 is illustrated in FIG. 6A. The manually adjustable potentiometer 370 can be adjusted by turning knob 370A to generate load signal 69. The discrete components are mounted to the printed circuit board 178 and electrically interconnected as previously described. Preferably the load signal 69 can be varied approximately 0–10 volts DC. Preferably, the output current of the override output board 300 preferably cannot exceed approximately 100 milliamps.

Figure 7:
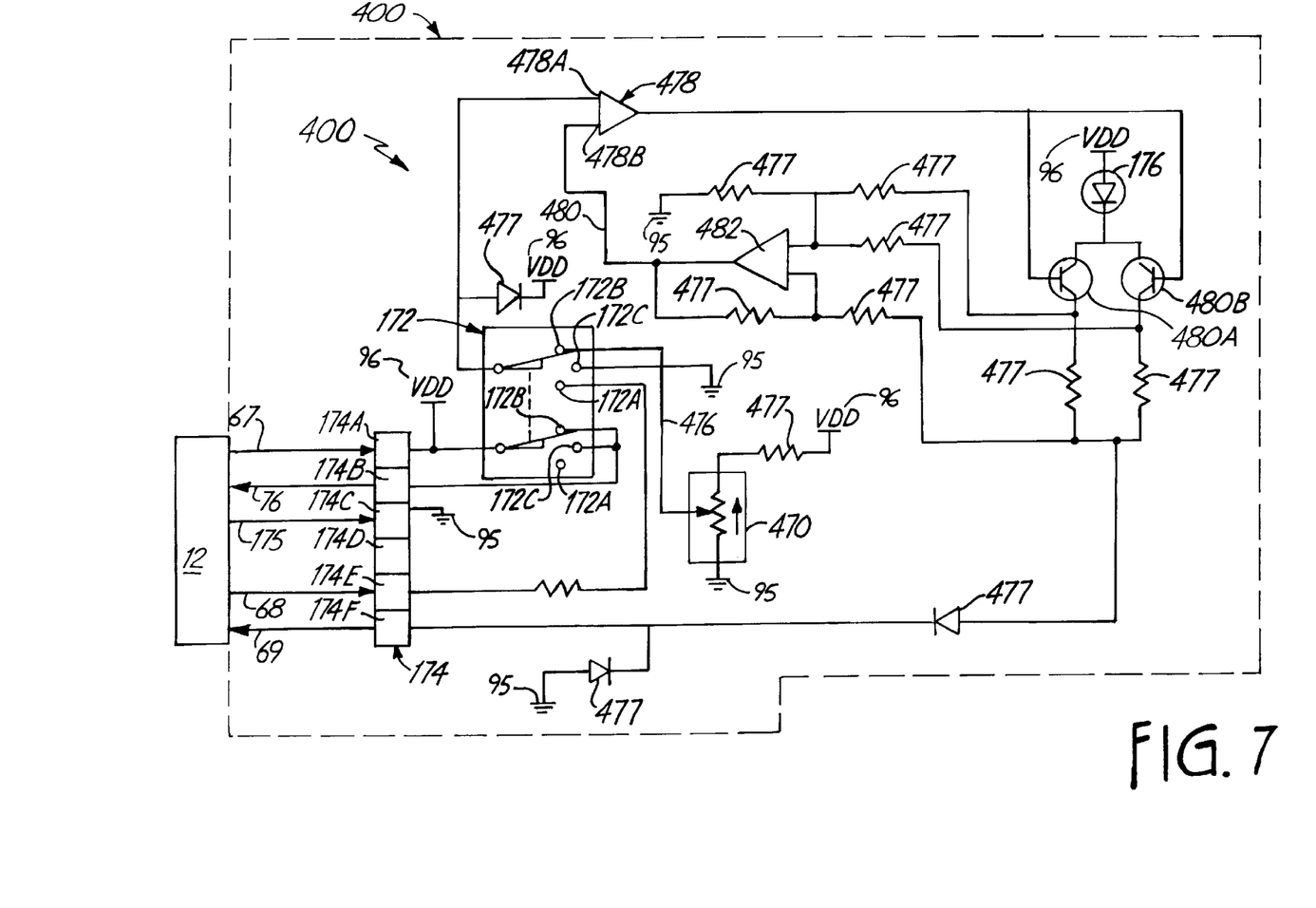
FIG. 7 is a circuit diagram for a fifth embodiment of the inventive override board.

A fifth embodiment of the inventive output override board is illustrated in FIG. 7 at 400. In this embodiment, a potentiometer is used as an output override device 470 to vary the amperage of the load signal 69 provided to the load 74. It should be noted that the fifth embodiment of the output override device 400 is similar in operation to the fourth embodiment of the output override device described above, with the exception that the load signal 69 in the fifth embodiment can be varied in amperage as opposed to voltage, as was described with respect to the fourth embodiment. The feedback signal 76 is generated in the same fashion as was described with respect to the first embodiment.

When the manual switch 172 is placed in the "hand" position 172B, a manually variable load signal 69 can be provided to interface socket 174F. By manually adjusting the output override device (potentiometer) 470, a potentiometer output amperage 476 can be directed to the op amp 478. The op amp 478 receives the potentiometer output amperage 476 at the first input 478A The op amp 478 compares the potentiometer output amperage 476 to an actual output amperage 480 connected to a second input 478B of the op amp 478. As was described with respect to the fourth embodiment, the op amp 478 adjusts throttling transistors 481A and 481B according to whether the output amperage 480 is higher or lower than the potentiometer output amperage 476. The circuit from the throttling transistors 481A and 481B is split into two main parts, the first main part is directed back to the second input 478B of the op amp 478. The first part is typically directed through a filtering circuit (as is known in the art) containing a filtering op amp 482. Thus, by throttling the throttling transistors 480A and 480B, the op amp 478 is compared with the potentiometer output amperage 476. The second part of the circuit from the throttling transistors 481A and 481B is directed to interface socket 174F and generates load signal 69. Current is directed through the LED 176 as the throttling transistors 478A and 480B are forward biased, lighting the LED 176 and providing a visual indication that the load signal 69 is being generated by the output override board 400.

When the manual switch 172 is in the "auto" position 172A, the actuating signal 68 from the PLC is directed through the manual switch 172 to the op amp 478. Specifically, the actuating signal 68 is directed to a first input 478A of an op amp 478. The actuating signal 68 takes the place of the potentiometer output amperage 476 as occurs when the manual switch 172 is in the "on" or "hand" position 172B. The op amp 478 attempts to balance the actuating signal 68 provided by the PLC 12 to the actual output amperage 480 provided by the throttling transistors 481A and 481B. Once again, the LED 176 is lit upon the activation of the actuating signal 68 by the PLC 12, since as the throttling transistors 480A and 480B are throttled by the op amp 478, the circuit to the LED 176 is closed, thereby lighting the LED 176 and creating a visual indication that the load signal 69 is being generated. Additional voltage and current regulating devices 477 such as resistors and diodes are provided in a manner known to those skilled in the art.

When the manual switch 72 is in the "off" position 72C, the load signal 69 is not provided to interface socket 174F. Additionally, no current is sent through the LED 176 and the LED 176 does not light, informing the operator that the load signal 69 is not being delivered to the interface socket 174F.

Figure 7A:
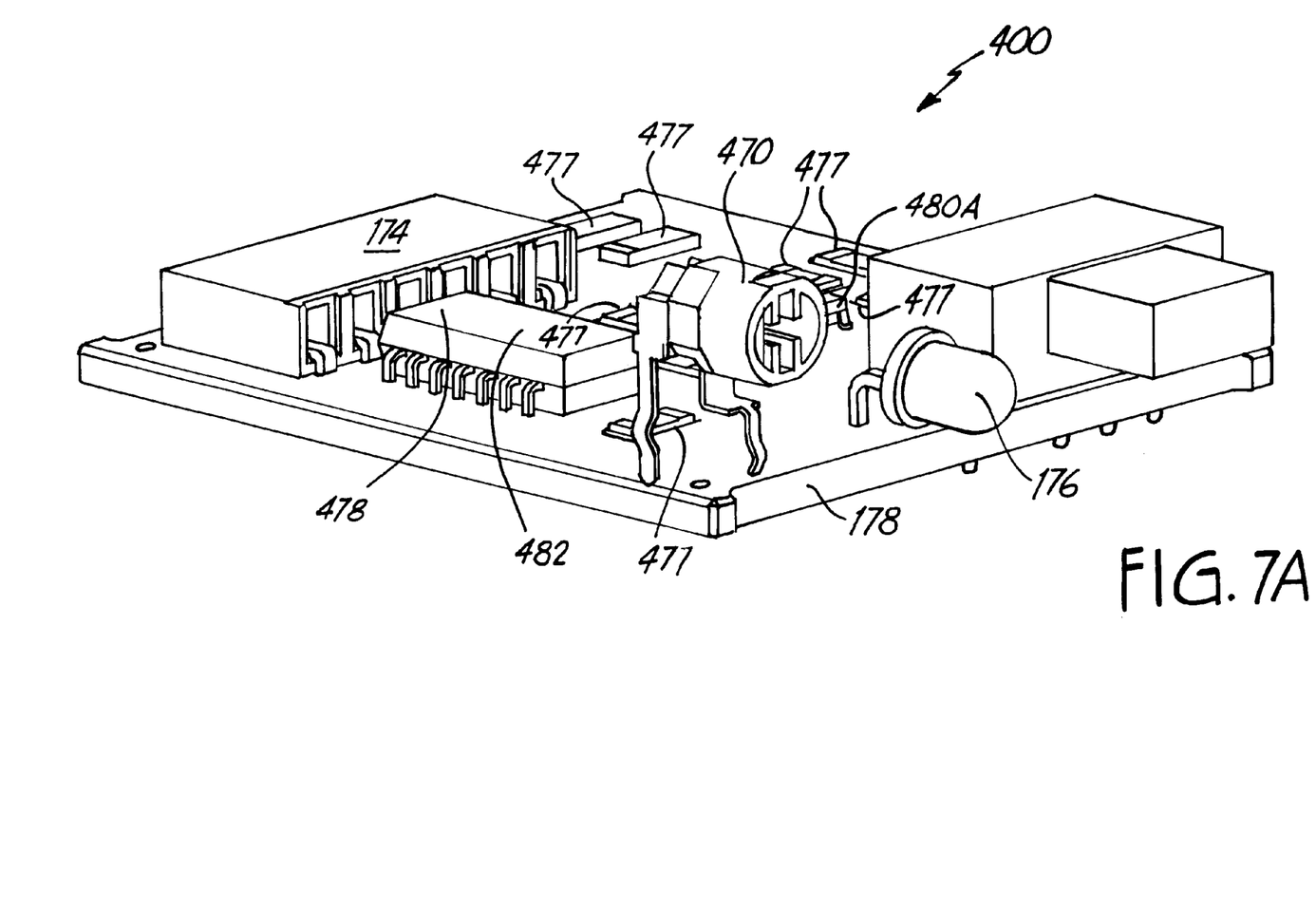
FIG. 7A is a perspective view of the fifth embodiment of the inventive override board.

FIG. 7A illustrates a physical embodiment of the fifth embodiment of the override output board 500. The discrete components of the output override board 500 are mounted to the printed circuit board 178 and electrically interconnected (by "traces" or wires) as described previously. The potentiometer 470 can be manually adjusted by turning knob 470A to provide approximately 0 to 20 milliamps to the interface socket 174F.

All the embodiments of the inventive output override device provide a versatile method for upgrading and controlling a programmable logic controller without requiring extensive designing or installation. The inventive output override board provides a way to manually override the programmable logic controller at the programmable logic controller site. This allows for easy maintenance and troubleshooting of the PLC of peripheral items delivering signals to the PLC or receiving signals from the PLC. Additionally, the inventive output override board provides an easily installable economic way to change the switching or controlling device which is directing each output signal from the PLC to the load. As discussed, these switching and controlling devices can include potentiometers, electro-mechanical switches, and solid state switches (e.g. transistors, triacs). It should be noted that other types of controlling devices may be used on the inventive output override board, although not specifically identified in the above embodiments.

Although the present invention has been described with reference to preferred embodiments, workers skilled in the art will recognize that changes may be made in form and detail without departing from the spirit and scope of the invention.

What is claimed is:

1. An override board used to control an output of a programmable logic controller, the override board comprising:
    a printed circuit board assembly;
    a connection means secured to the printed circuit board assembly and configured so as to allow the override board to be releasably secured from a mating connection means disposed on the programmable logic controller;
    a manual switch assembly, the manual switch having a first position, a second position and a third position; and
    output device mounted to the printed circuit board assembly, wherein the output device is electrically connected to the manual switch and wherein placing the manual switch in the first position transfers control of the override board to the programmable logic controller, placing the manual switch in the second position energizes the output device, and placing the manual switch in the third position de-energizes the output device.

2. The board of claim 1 and further comprising:
    a feedback circuit on the printed circuit board assembly which provides a signal to the programmable logic controller indicating the position of the manual switch.

3. The board of claim 1 and further comprising:
    a light emitting device which provides a visual indication of whether the output device is energized.

4. The board of claim 3 wherein the light emitting device is a light emitting diode.

5. The board of claim 1 wherein the output device is an electro-mechanical relay having contacts in a normally open position.

6. The board of claim 1 wherein the output device is a normally closed electro-mechanical relay having contacts in a normally closed position.

7. The board of claim 1 wherein the output device is a triac.

8. The board of claim 1 wherein the output device is a manually adjustable potentiometer.

9. The board of claim 8 wherein the manually adjustable potentiometer controls the voltage of the output of the programmable logic controller.

10. The board of claim 8 wherein the manually adjustable potentiometer controls the amperage of the output of the programmable logic controller.

11. A method for controlling the output of a programmable logic controller comprising:
    releasably inserting a first override board into a programmable logic controller such that the first override board interfaces with a logic circuit of the programmable logic controller;
    providing a load signal from an output device attached on the first override board as the output of the programmable logic controller;
    positioning a manual switch attached to the first override board into a first position having an energizing effect on the output device;
    positioning the manual switch into a second position having a de-energizing effect on the output device; and
    positioning the manual switch into a third position, transferring control of the output of the programmable logic controller to the logic circuit of the programmable controller.

12. The method of claim 11 and further comprising:
    providing a feedback signal from the override board to the programmable logic controller indicating the position of the manual switch.

13. The method of claim 11 and further comprising:
    visually indicating when the load signal is being provided from the output device.

14. The method of claim 11 wherein the step of providing a load signal further comprises:
    switching the load signal through an electromechanical relay having normally open contacts.

15. The method of claim 11 wherein the step of providing a load signal further comprises:
    switching the load signal through an electro-mechanical relay having normally closed contacts.

16. The method of claim 11 wherein the step of providing a load signal further comprises:
    switching the load signal through a triac.

17. The method of claim 11 wherein the step of providing a load signal further comprises:
    manually adjusting the voltage of the load signal using a potentiometer.

18. The method of claim 11 wherein the step of providing a load signal further comprises:
   manually adjusting the amperage of the load signal using a potentiometer.
19. The method of claim 11, further comprising:
   removing the first override board from the programmable logic controller;
   releasably inserting a second override board into the programmable logic controller such that the second override board interfaces with the logic circuit of the programmable logic controller.
20. An apparatus comprising:
   a programmable logic controller including a plurality of controller connectors, and
   a plurality of override boards each override board including:
      a printed circuit board;
      a connector secured to the print circuit board and releasably coupled to one of the controller connectors;
      a manual switch assembly having a first position, a second position and a third position;
      an output device mounted to the printed circuit board, wherein the output device is electrically connected to the manual switch and wherein placing the manual switch in the first position transfers control of the override board to the programmable logic controller, placing the manual switch in the second position energizes the output device, and placing the manual switch in the third position de-energizes the output device; and
   a feedback circuit connecting the programmable logic controller and each override board.

* * * * *